(12) United States Patent  
Jung et al.

(10) Patent No.: US 8,823,486 B2  
(45) Date of Patent: Sep. 2, 2014

(54) ANTITHEFT SYSTEM OF CHARGER FOR ELECTRIC VEHICLE

(75) Inventors: Yun Jae Jung, Gyeonggi-do (KR); Seok Kim, Ulsan (KR); Taehyoung Park, Jeollabuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 439 days.

(21) Appl. No.: 13/214,591

(22) Filed: Aug. 22, 2011

(65) Prior Publication Data

US 2012/0139695 A1 Jun. 7, 2012

(30) Foreign Application Priority Data

Dec. 2, 2010 (KR) ........................ 10-2010-0122243

(51) Int. Cl.
*G05B 19/00* (2006.01)

(52) U.S. Cl.
USPC ........... 340/5.6; 340/5.2; 340/5.64; 340/5.72; 320/104; 320/109; 320/116; 320/123; 320/166; 439/352; 439/345; 439/310

(58) Field of Classification Search
CPC . Y02T 10/7005; Y02T 10/7088; Y02T 90/14; Y02T 90/121; Y02T 10/70; B60L 11/1818; B60L 2270/32; B60L 2270/34; B60L 11/1838; G07C 9/00309; G07C 9/00182
USPC .......... 340/5.2, 5.6, 5.64, 5.72; 320/104, 109, 320/116, 123, 166; 439/352, 345, 310
See application file for complete search history.

(56) References Cited

U.S. PATENT DOCUMENTS

| | | | | |
|---|---|---|---|---|
| 3,030,814 A | * | 4/1962 | Ainsworth | 73/503 |
| 3,072,836 A | * | 1/1963 | Eisengrein | 318/600 |
| 3,543,126 A | * | 11/1970 | Nolan et al. | 320/123 |
| 4,306,449 A | * | 12/1981 | Hoffman | 73/114.25 |
| 4,477,764 A | * | 10/1984 | Pollard | 320/116 |
| 5,711,558 A | * | 1/1998 | Woody | 292/335 |
| 5,812,682 A | * | 9/1998 | Ross et al. | 381/71.11 |
| 5,816,643 A | * | 10/1998 | Itou et al. | 296/97.22 |
| 5,997,333 A | * | 12/1999 | Konda et al. | 439/352 |
| 6,157,162 A | * | 12/2000 | Hayashi et al. | 320/104 |
| 6,215,282 B1 | * | 4/2001 | Richards et al. | 320/160 |
| 7,714,544 B2 | * | 5/2010 | Bolz et al. | 320/166 |
| 8,172,599 B2 | * | 5/2012 | Konchan | 439/352 |

(Continued)

FOREIGN PATENT DOCUMENTS

JP 07037644 A 2/1995
JP 10178701 A 6/1998

*Primary Examiner* — George Bugg
*Assistant Examiner* — Paul Obiniyi
(74) *Attorney, Agent, or Firm* — Edwards Wildman Palmer LLP; Peter F. Corless

(57) ABSTRACT

An antitheft system of a charger for an electric vehicle that prevents theft of a charger during charging a battery of the electric vehicle is disclosed.
More specifically, a first signal generating portion is provided at the charger, receives a decoupling will of the charger, and generates a decoupling signal. A second signal generating portion generates a position signal, so that anyone who is allowed to handle the electric vehicle possesses the second signal generating portion. A control portion generates an operating signal when both the decoupling signal of the first signal generating portion and the position signal of the second signal generating portion are received by the control portion. Once received, an actuator decouples the charger from the connector once the operating signal from the control portion is received.

17 Claims, 7 Drawing Sheets

(56) References Cited

U.S. PATENT DOCUMENTS

| | | | |
|---|---|---|---|
| 8,188,838 B2* | 5/2012 | Choi | 340/5.64 |
| 8,294,415 B2* | 10/2012 | Fujitake | 320/104 |
| 8,311,690 B2* | 11/2012 | Tanaka | 701/22 |
| 8,400,263 B2* | 3/2013 | Lickfelt et al. | 340/5.64 |
| 8,550,833 B2* | 10/2013 | Martin | 439/310 |
| 2002/0020236 A1* | 2/2002 | Onodera | 74/335 |
| 2004/0178883 A1* | 9/2004 | Haselsteiner et al. | 340/5.72 |
| 2005/0172794 A1* | 8/2005 | Hoffmann et al. | 91/361 |
| 2008/0238527 A1* | 10/2008 | Bolz et al. | 327/404 |
| 2009/0295169 A1* | 12/2009 | Usselman et al. | 290/1 A |
| 2010/0123548 A1* | 5/2010 | Choi | 340/5.64 |
| 2010/0123549 A1* | 5/2010 | Lickfelt et al. | 340/5.64 |
| 2010/0225274 A1* | 9/2010 | Fujitake | 320/109 |
| 2012/0126747 A1* | 5/2012 | Kiko et al. | 320/109 |
| 2012/0129378 A1* | 5/2012 | Kiko et al. | 439/345 |
| 2013/0057209 A1* | 3/2013 | Nergaard et al. | 320/109 |
| 2013/0057210 A1* | 3/2013 | Nergaard et al. | 320/109 |

* cited by examiner

ANTITHEFT SYSTEM OF CHARGER FOR ELECTRIC VEHICLE

CROSS-REFERENCE TO RELATED APPLICATION

This application claims priority to and the benefit of Korean Patent Application No. 10-2010-0122243 filed in the Korean Intellectual Property Office on Dec. 2, 2010, the entire contents of which are incorporated herein by reference.

BACKGROUND OF THE INVENTION (a) Field of the Invention

The present invention relates to an antitheft system of a charger for an electric vehicle. More particularly, the present invention relates to an antitheft system of a charger for an electric vehicle that prevents theft of a slow charger during charging of a battery of the electric vehicle.

(b) Description of the Related Art

Recently, electric vehicles or hybrid vehicles have been developed and received attention for their enhanced fuel economy. An electric vehicle uses one or more electric motors or traction motors to generate torque for propulsion. A hybrid vehicle uses both an engine and an electric motor to generate driving torque for propulsion.

In a hybrid vehicle, the engine mounted within the vehicle is operated so as to charge the battery. However, an electric vehicle has no such engine mounted within the vehicle. Instead electricity must be supplied to the electric vehicle from an exterior source so as to charge the battery. For this purpose, electric vehicles are equipped with a connector for making a connection to this exterior source.

There are two type of charging processes for charging an electric vehicle, (1) fast charging type and (2) slow charging type. Fast charging utilizes a fast charger provided at a charging station that is connected to the vehicle's connector and the vehicle is charged. Slow charging utilizes an input terminal of a slow charger that is connected to a home socket, an output terminal of the slow charger is connected to the vehicle's connector, thus, charging the vehicle.

A conventional slow charger typically has a lever switch. When pushed, the lever switch can disconnect the slow charger from the connector of the vehicle. Unfortunately because they can be easily disconnected, slow chargers can be easily stolen. Generally, 6 hours is required for charging the battery of the vehicle when utilizing a slow charger. Therefore, if an owner of the vehicle does not stay near the to vehicle until the battery is completely charged, anyone can steal the slow charger during this extended period of time.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a slow charger that can be decoupled from a connector only when an owner of the vehicle or anyone who is allowed to handle the vehicle is near the vehicle.

An antitheft system of a charger for an electric vehicle according to an exemplary embodiment of the present invention may perform charge by coupling a charger connected to an exterior power source to a connector provided at the electric vehicle. In particular, the antitheft system may include: a first signal generating portion, provided at the charger, receives a decoupling will of the charger, and generates a decoupling signal; a second signal generating portion generates a position signal, so that anyone who is allowed to handle the electric vehicle possesses the second signal generating portion; a control portion generates an operating signal when both the decoupling signal of the first signal generating portion and the position signal of the second signal generating portion are received by the control portion; and an actuator decouples the charger from the connector once the operating signal from the control portion is received.

In some embodiments of the present invention, the control portion may calculate the distance from the electric vehicle to the second signal generating portion based on the position signal received from the second signal generating portion, and to may generate the operating signal when that the distance from the electric vehicle to the second signal generating portion is less than or equal to a predetermined distance.

The charger may also be provided with a switch which selectively applies electricity to the first signal generating portion and a hook protruding from a front end thereof. Along those same lines, the connector may be provided with a clasp which is coupled to or decoupled from the hook by operation of the actuator.

The switch may include: a pushing portion formed at a first end and exposed to the exterior of a charger housing; a first lever shaft formed at a middle portion, mounted at the charger housing, and configured to pivot the switch; and a first elastic member mounted between a second end of the switch and the charger housing and applying elastic force to the second end of the switch, wherein the first signal generating portion receives electricity and generates the decoupling signal once the pushing portion is pushed.

In yet other embodiments of the present invention, the clasp may be coupled to the hook when the actuator does not operate and may be decoupled from the hook by elastic force of a second elastic member when the actuator operates.

Furthermore, the second signal generating portion may be provided at a smart key and may also generate the position signal after receiving the decoupling signal from the first signal generating portion. The control portion may receive the decoupling signal indirectly from the second signal generating portion. Herein, it is to be understood that indirect receiving the decoupling signal from the second signal generating portion means that the second signal generating portion receives the decoupling signal and delivers it to the control portion or the second signal generating portion receives the decoupling signal and generates the position signal.

The second signal generating portion may be configured to continuously to generate the position signal and the control portion may receive the decoupling signal directly from the first signal generating portion.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION OF THE EMBODIMENTS

An exemplary embodiment of the present invention will hereinafter be described in detail with reference to the accompanying drawings.

Note that it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, plug-in hybrid electric vehicles, hydrogen-powered hybrid vehicles and other alternative hybrid vehicles. As referred to herein, a hybrid vehicle is a vehicle that has two or more sources of power, for example both gasoline-powered and electric-powered vehicles.

Figure 1:
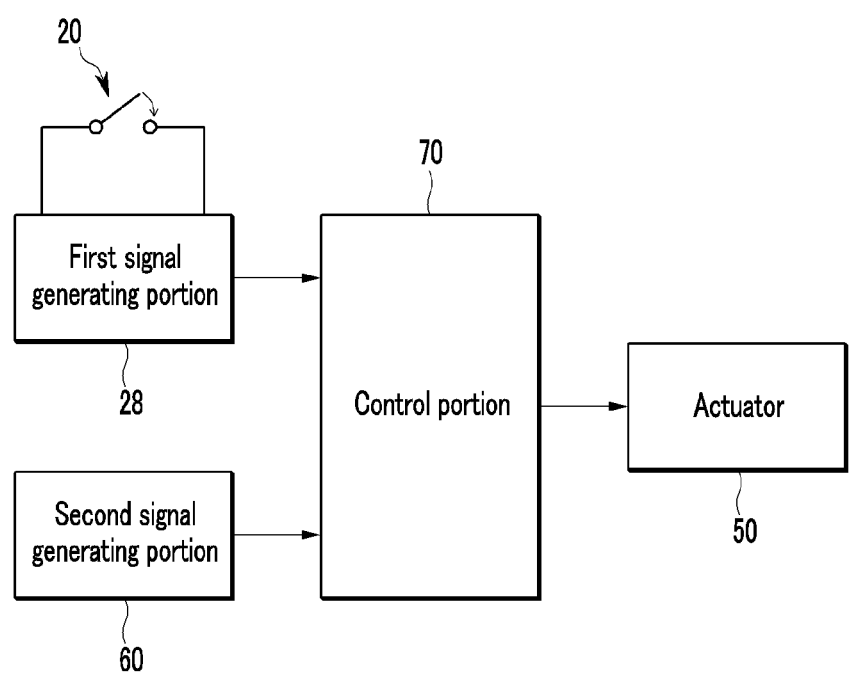
FIG. 1 is a block diagram of an antitheft system of a charger for an electric vehicle according to an exemplary embodiment of the present invention.

FIG. 1 is a block diagram of an antitheft system of a charger for an electric vehicle according to an exemplary embodiment of the present invention.

As shown in FIG. 1, an antitheft system of a charger for an electric vehicle according to an exemplary embodiment of the present invention includes a first signal generating portion 28, a switch 20, a second signal generating portion 60, a control portion 70, and an actuator 50.

The first signal generating portion 28 receives a decoupling will of a charger 10 (referring to FIG. 2) and generates a decoupling signal. The first signal generating portion 28 may be provided at the charger 10.

The switch 20 delivers the decoupling will of the charger 10 to the first signal generating portion 28. That is, current is flowed to the first signal generating portion 28 and the first signal generating portion 28 generates the decoupling signal if the switch 20 is operated (i.e., closed). The switch 20 may be provided at the charger 10.

The second signal generating portion 60 can be possessed by an owner of the electric vehicle or anyone who is allowed to handle the electric vehicle. The second signal generating portion 60 generates a position signal of a person who possesses it. The second signal generating portion 60 may generate the position signal after receiving the decoupling signal from the first signal generating portion 28 or may continuously generate a position signal. In some embodiments of the present invention, the second signal generating portion 60 may be a smart key of the vehicle. In addition, anyone who possesses the smart key is regarded as a person who is allowed to handle the electric vehicle.

The control portion 70 receives the decoupling signal from the first signal generating portion 28 and receives the position signal from the second signal generating portion 60. The control portion 70 generates an operating signal once both the decoupling signal and the position signal are received by the control portion 70. In addition, the control portion 70 calculates a distance between the electric vehicle and the second signal generating portion 60 based on the position signal of the second signal generating portion 60 when the decoupling signal is received, and generates the operating signal if the distance between the electric vehicle and the second signal generating portion 60 is less than or equal to a predetermined distance. The predetermined distance can be set by a person of an ordinary skill in the art. For example, the predetermined distance may be about 5 m. In addition, the control portion 70 can receive the decoupling signal directly from the first signal generating portion 28 or indirectly through the second signal generating portion 60. Further, when the second signal generating portion 60 generates the position signal after receiving the decoupling signal from the first signal generating portion 28, the control portion 70 may determine that the decoupling signal of the first signal generating portion 60 has been received if the position signal of the second signal generating portion 60 is received. Subsequently, the actuator 50 decouples the charger 10 from the connector if the operating signal is received from the control portion 70.

Hereinafter, the connector and the charger 10 according to an exemplary embodiment of the present invention will be described in detail.

Figure 2:
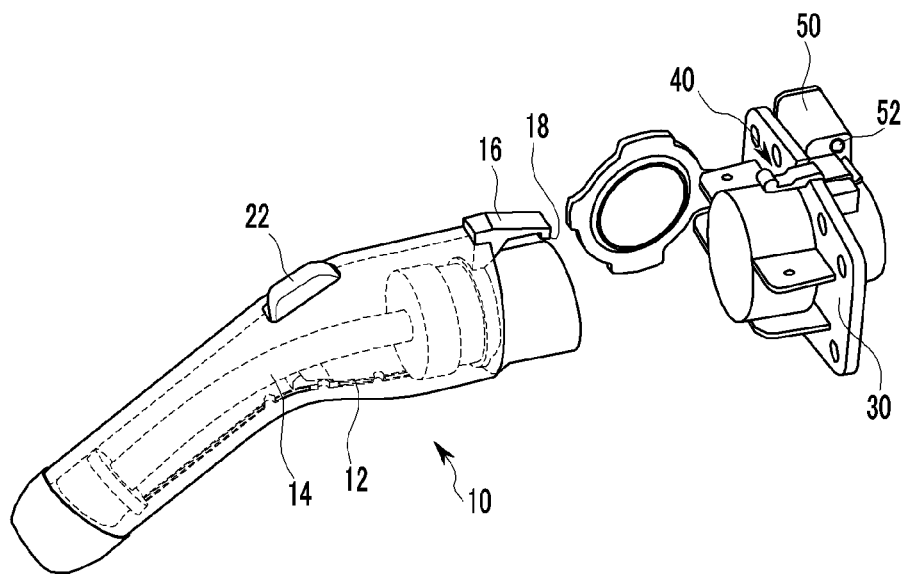
FIG. 2 illustrates a decoupled state of a connector and a charger in an exemplary embodiment of the present invention.
Figure 3:
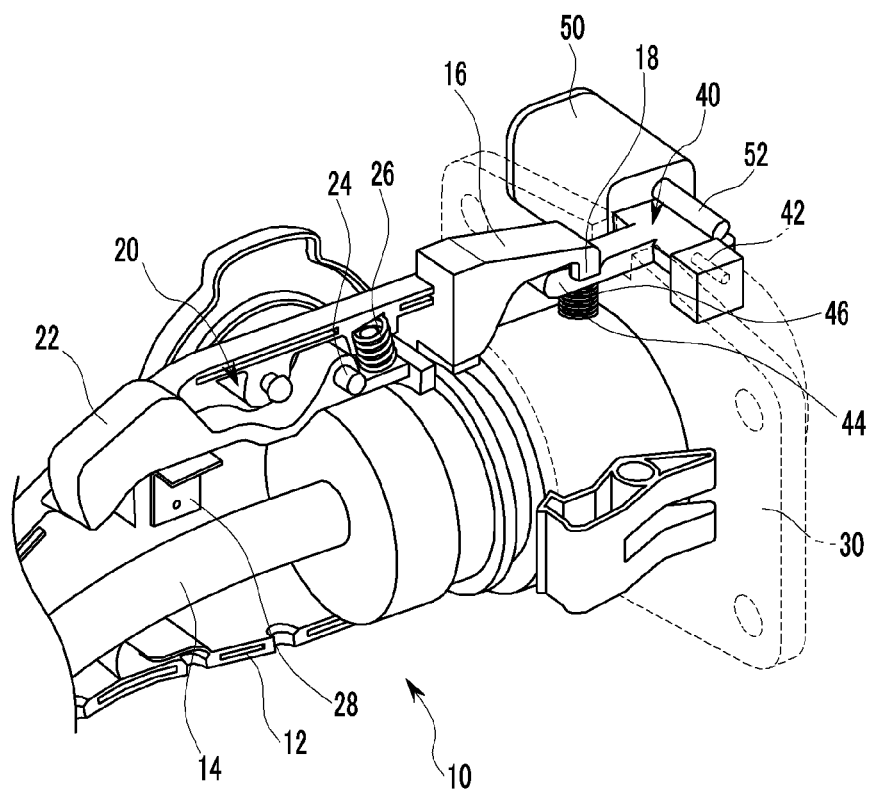
FIG. 3 illustrates a coupled state of a connector and a charger in an exemplary embodiment of the present invention.

FIG. 2 illustrates a decoupled state of a connector and a charger in an exemplary embodiment of the present invention, and FIG. 3 illustrates a coupled state of a connector and a charger in an exemplary embodiment of the present invention.

As shown in FIG. 2 and FIG. 3, the switch 20 and the first signal generator 28 are provided at the charger 10, and the actuator 50 is provided at the connector.

A charger housing 12 is formed at an exterior of the charger 10, and a cable 14 is provided in the charger housing 12. The cable 14 electrically connects an exterior power source to a battery of the electric vehicle through the connector.

The switch 20 is mounted in the charger housing 12, and a pushing portion 22 formed at a first end of the switch 20 is exposed to the exterior of the charger housing 12 such that a user can push the pushing portion 22. The switch 20 is mounted in the charger housing 12 through a first lever shaft 24 formed at a middle portion thereof. Therefore, the first end and a second end of the switch 20 are configured to rotate with respect to the first lever shaft 24. In addition, a first elastic member 26 is mounted between the second end of the switch 20 and the charger housing 12 so as to apply an elastic force to the switch 20. That is, if the user pushes the pushing portion 22 so as to decouple the charger 10 from the connector, the switch 20 rotates counterclockwise with respect to the first lever shaft 24. If the user unhands the pushing portion 22, the switch 20 rotates clockwise with respect to the first lever shaft 24 by the elastic force of the first elastic member 26.

The first signal generator 28 is mounted in the charger housing 12 corresponding to the switch 20. Therefore, if the user pushes the pushing portion 22, the switch 20 makes contact with the first signal generator 28 and in response the first signal generator 28 generates a decoupling signal.

A hook 16 is protruded forwardly from a front end of the charger housing 12, and a hook jaw 18 is bent downwardly from a front end of the hook 16. The connector is mounted at a connector housing 30 and couples to or decouples from the charger 10. A clasp 40 and the actuator 50 are mounted at the connector housing 30 as well.

The clasp 40 is positioned at a position corresponding to the hook 16 so that the charger 10 couples to the connector. A clasp jaw 44 is bent upwardly from one end of the clasp 40 so as to be hooked to the hook jaw 18. In addition, the clasp 40 can rotate by a second lever shaft 42 formed at a middle portion of the clasp 40, and a receiving portion 48 (shown in FIG. 4) is formed at the other end of the clasp 40. In addition, a second elastic member 46 is mounted between the one end portion of the clasp 40 and the connector housing 30.

The actuator 50 rotates the clasp 40 so as to couple the clasp with the hook 16, and includes an operating rod 52. The operating rod 52 is protruded from the actuator 50 and pushes the receiving portion 48 downwardly when the actuator 50 operates. Accordingly, the clasp jaw 44 moves upwardly and is hooked by the hook jaw 18. Therefore, the charger 10 is coupled to the connector. If the actuator 50 does not operate, the operating rod 52 is inserted in the actuator 50 and the clasp jaw 44 moves downwardly by the elastic force of the second elastic member 46. Therefore, the clasp jaw 44 and the hook jaw 18 are decoupled and thereby the charger 10 is decoupled from the connector.

Various means may be used so as to rotate the clasp 40 by protrusion of the operating rod 52. For example, the operating rod 52 may be protruded downwardly and may push the receiving portion 48 downwardly. Or, the receiving portion 48 may be formed of a slanted surface and may push the receiving portion 48 downwardly when the operating rod 52 is protruded horizontally.

Meanwhile, the operating rod 52 is protruded by operation of the actuator 50 and rotates the clasp 40 in this specification, but is not limited to this. For example, the actuator 50 such as a motor may be connected to the clasp 40 and may directly rotate the clasp 40.

Hereinafter, operation of the antitheft system according to an exemplary embodiment of the present invention will be described in detail.

Figure 4:
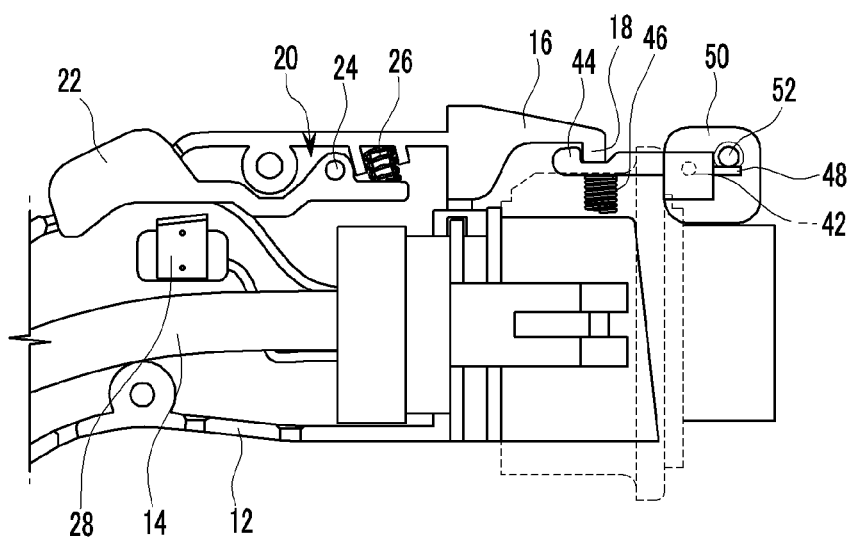
FIG. 4 and FIG. 5 illustrate a coupled state of a hook and a clasp in an exemplary embodiment of the present invention.
Figure 5:
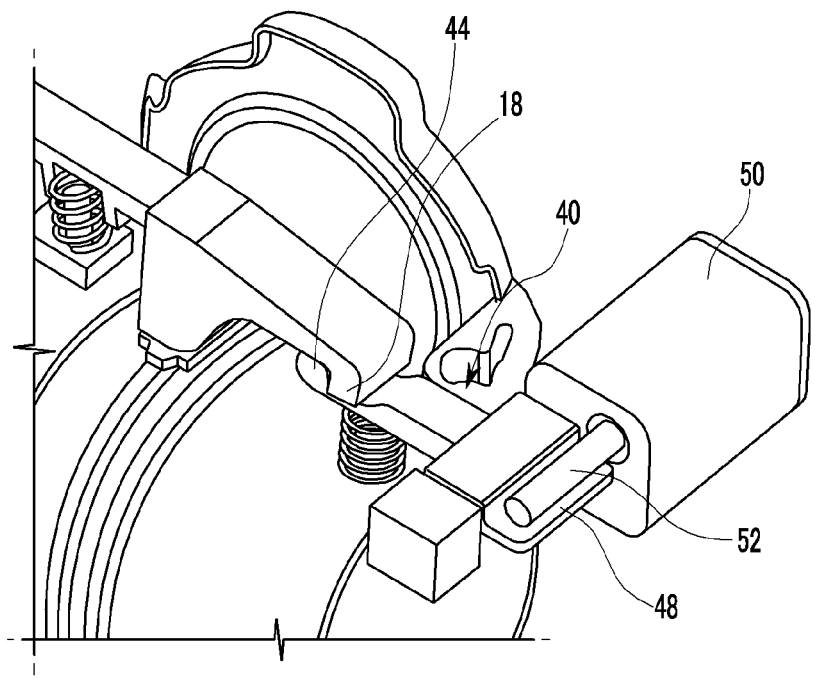

As shown in FIG. 4 and FIG. 5, in a state that the charger 10 is coupled to the connector, the operating rod 52 is protruded from the actuator 50 and pushes the receiving portion 48 downwardly. Accordingly, the clasp jaw 44 moves upwardly and is coupled to the hook jaw 18 formed at the front portion of the charger 10.

Figure 6:
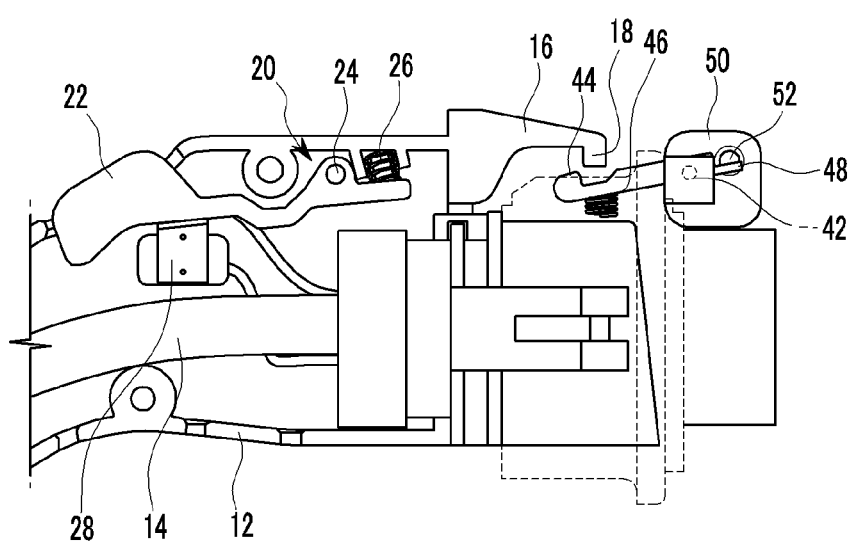
FIG. 6 and FIG. 7 illustrate a decoupled state of a hook and a clasp in an exemplary embodiment of the present invention.
Figure 7:
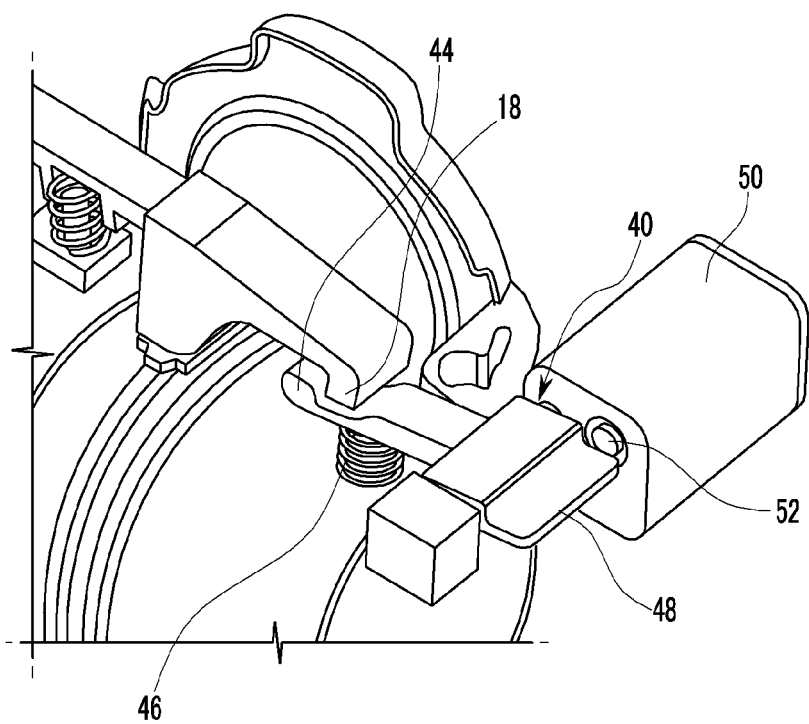

At this state, if the user pushes the pushing portion 22 of the switch 20 provided at the charger 10 so as to decouple the charger 10 from the connector, the switch 20 rotates counterclockwise and contacts to the first signal generating portion 28 as shown in FIG. 6 and FIG. 7. Therefore, the first signal generating portion 28 generates the decoupling signal and the control portion 70 receives the decoupling signal.

The control portion 70 receiving the decoupling signal determines whether the position signal is received from the second signal generating portion 60. As described above, the second signal generating portion 60 may be the smart key which the owner of the vehicle possesses.

If the position signal is not received from the second signal generating portion 60, the control portion 70 determines that the charger 10 is being attempted to be decoupled by an unauthorized user and thus does not generate the operating signal. Accordingly, the clasp jaw 44 and the hook jaw 18 remain coupled and the charger 10 cannot be decoupled from the connector.

If a position signal is received from the second signal generating portion 60, the control portion 70 determines that the charger 10 is being decoupled by an authorized user. Therefore, the control portion 70 generates the operating signal and delivers it to the actuator 50. In this case, the operating rod 52 is inserted in the actuator 50 and force applying to the receiving portion 48 vanishes. Therefore, the clasp 40 rotates counterclockwise by the elastic force of the second elastic member 46 and the clasp jaw 44 moves downwardly so as to be decoupled from the hook jaw 18. Therefore, the charger 10 can be decoupled from the connector.

Meanwhile, when the charger 10 is not coupled to the connector, the operating rod 52 is inserted in the actuator 50. At this state, if the connector is coupled with the charger 10, the actuator 50 protrudes the operating rod 52.

As described above, since a charger can be decoupled from a connector only when an owner of a vehicle or anyone who is allowed to handle the vehicle is near the vehicle, theft of the charger may be prevented according to an exemplary embodiment of the present invention.

In addition, since the theft of the charger is prevented by using a smart key that is already applied to some vehicles, manufacturing costs may not be largely increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An antitheft system of a charger for an electric vehicle that performs charge by coupling a charger connected to an exterior power source to a connector provided at the electric vehicle, comprising:
   a first signal generating portion provided at the charger, the first signal generating portion configured to receive a decoupling will of the charger, and generate a decoupling signal;
   a second signal generating portion configured to generate a position signal, so that anyone who is allowed to handle the electric vehicle possess the second signal generating portion;
   a control portion configured to generate an operating signal when both the decoupling signal of the first signal generating portion and the position signal of the second signal generating portion are received from by the control portion; and
   an actuator decoupling the charger from the connector in response to receiving the operating signal from the control portion.

2. The antitheft system of claim 1, wherein the control portion calculates a distance from the electric vehicle to the second signal generating portion based on the position signal received from the second signal generating portion, and generates the operating signal when the distance from the electric vehicle to the second signal generating portion is less than or equal to a predetermined distance.

3. The antitheft system of claim 1, wherein the charger is provided with a switch selectively applying electricity to the first signal generating portion and a hook protruding from a front end thereof, and
   wherein the connector is provided with a clasp coupled to or decoupled from the hook by operation of the actuator.

4. The antitheft system of claim 3, wherein the switch comprises:
   a pushing portion formed at a first end and exposed to the exterior of a charger housing;
   a first lever shaft formed at a middle portion, mounted at the charger housing, and configured to pivot the switch; and
   a first elastic member mounted between a second of the switch and the charger housing and applying elastic force to the second end of the switch,
   wherein the first signal generating portion receives the electricity and generates the decoupling signal in response to pushing the pushing portion.

5. The antitheft system of claim 3, wherein the clasp is coupled to the hook when the actuator does not operate and is decoupled from the hook by elastic force of a second elastic member when the actuator operates.

6. The antitheft system of claim 1, wherein the second signal generating portion is provided at a smart key.

7. The antitheft system of claim 6, wherein the second signal generating portion generates the position signal after receiving the decoupling signal from the first signal generating portion.

8. The antitheft system of claim 7, wherein the control portion receives the decoupling signal indirectly from the second signal generating portion.

9. The antitheft system of claim 6, wherein the second signal generating portion always generates the position signal and the control portion receives the decoupling signal directly from the first signal generating portion.

10. A method for preventing theft of a charger for an electric vehicle, comprising:
   receiving, by a first signal generating portion provided at the charger, a decoupling will of the charger;
   in response to receiving the decoupling will, generating, by the first signal generating portion, a decoupling signal;
   generating, by a second signal generating portion, a position signal, so that anyone who is allowed to handle the electric vehicle possess the second signal generating portion;
   in response to both the decoupling signal of the first signal generating portion and the position signal of the second signal generating portion being received from by a control portion, generating an operating signal; and
   in response to receiving the operating signal from the control portion, decoupling the charger from the connector by an actuator.

11. The method of claim 10, further comprising calculating, by the control portion, a distance from the electric vehicle to the second signal generating portion based on the position signal received from the second signal generating portion; and generating the operating signal when the distance from the electric vehicle to the second signal generating portion is less than or equal to a predetermined distance.

12. The method of claim 10, further comprising selectively applying electricity by a switch on the charger, to the first signal generating portion wherein the charger is connected to a connector by a hook protruding from a front end of the charger, and
   wherein the connector is provided with a clasp to be coupled to or decoupled from the hook by operation of the actuator.

13. The method of claim 12, further comprising coupling the clasp to the hook when the actuator does not operate and decoupling the clasp from the hook by elastic force of a second elastic member when the actuator operates.

14. The antitheft system of claim 10, wherein the second signal generating portion is provided at a smart key.

15. The antitheft system of claim 14, further comprising generating by the second signal generating portion, the position signal after receiving the decoupling signal from the first signal generating portion.

16. The antitheft system of claim 15, further comprising receiving the decoupling signal indirectly from the second signal generating portion.

17. The antitheft system of claim 14 wherein the second signal generating portion continuously generates the position signal and the control portion receives the decoupling signal directly from the first signal generating portion.

* * * * *